United States Patent
Cronin et al.

(10) Patent No.: US 10,124,738 B2
(45) Date of Patent: Nov. 13, 2018

(54) ROOF RACK ASSEMBLIES AND SECURING MECHANISMS FOR ROOF RACK ASSEMBLIES

(71) Applicant: DEE ZEE, INC., Des Moines, IA (US)

(72) Inventors: Scott Cronin, Des Moines, IA (US); Jason Schott, Ankeny, IA (US)

(73) Assignee: Dee Zee, Inc., Des Moines, IA (US)

( * ) Notice: Subject to any disclaimer, the term of this patent is extended or adjusted under 35 U.S.C. 154(b) by 0 days.

(21) Appl. No.: 15/034,450

(22) PCT Filed: Nov. 5, 2014

(86) PCT No.: PCT/US2014/064021
§ 371 (c)(1),
(2) Date: May 4, 2016

(87) PCT Pub. No.: WO2015/069695
PCT Pub. Date: May 14, 2015

(65) Prior Publication Data
US 2016/0264060 A1    Sep. 15, 2016

Related U.S. Application Data

(60) Provisional application No. 61/900,005, filed on Nov. 5, 2013.

(51) Int. Cl.
| B60R 9/052 | (2006.01) |
| B60R 9/058 | (2006.01) |
| B60R 9/045 | (2006.01) |

(52) U.S. Cl.
CPC .............. B60R 9/058 (2013.01); B60R 9/045 (2013.01)

(58) Field of Classification Search
CPC .................................. B60R 9/058; B60R 9/045
(Continued)

(56) References Cited

U.S. PATENT DOCUMENTS

| 3,554,416 A | 1/1971 | Bott et al. |
| 5,145,267 A | 9/1992 | Cucheran et al. |

(Continued)

OTHER PUBLICATIONS

International Search Report and Written Opinion issued in corresponding PCT Appln. No. PCT/US2014/064021 dated Feb. 17, 2015.
(Continued)

*Primary Examiner* — Derek Battisti
(74) *Attorney, Agent, or Firm* — Dinsmore & Shohl LLP

(57) ABSTRACT

Roof rack assemblies and securing mechanisms for roof rack assemblies are disclosed herein. In one embodiment, a securing mechanism includes a track, the track including an upper lip, a lower lip, and at least one notch, a support portion that is configured to translate along the track, the support portion including a lower surface, a rib positioned on the lower surface, where the rib is configured to engage the at least one notch of the track, a release member, and a securing latch, where the securing latch is repositionable between a latched position, in which the securing latch is engaged with the upper lip of the track and the rib is engaged with the at least one notch, and a unlatched position, in which the securing latch is detached from the upper lip of the track and the rib is detached from the at least one notch.

20 Claims, 7 Drawing Sheets

(58) Field of Classification Search
USPC .......................................................... 224/321
See application file for complete search history.

(56) References Cited

U.S. PATENT DOCUMENTS

| | | | |
|---|---|---|---|
| 5,190,198 A | 3/1993 | Cucheran | |
| 5,203,483 A * | 4/1993 | Cucheran | B60R 9/045 224/321 |
| 5,456,512 A * | 10/1995 | Gibbs | B60R 9/045 224/321 |
| 5,553,761 A * | 9/1996 | Audoire | B60R 9/05 224/321 |
| 5,924,614 A * | 7/1999 | Kuntze | B60R 9/045 224/321 |
| 6,010,048 A * | 1/2000 | Settelmayer | B60R 9/045 224/315 |
| 6,102,265 A * | 8/2000 | Stapleton | B60R 9/045 224/321 |
| 6,283,310 B1 * | 9/2001 | Dean | B60R 9/048 211/17 |
| 6,905,053 B2 * | 6/2005 | Allen | B60R 9/045 224/315 |
| 6,997,657 B1 * | 2/2006 | Saward | B60R 9/058 224/315 |
| 8,408,853 B2 * | 4/2013 | Womack | B60P 7/0815 410/104 |
| 2005/0051585 A1 | 3/2005 | Kamiya et al. | |

OTHER PUBLICATIONS

International Preliminary Report on Patentability issued in corresponding PCT Appln. No. PCT/US2014/064021 dated May 10, 2016.

* cited by examiner

ROOF RACK ASSEMBLIES AND SECURING MECHANISMS FOR ROOF RACK ASSEMBLIES

CROSS REFERENCE TO RELATED APPLICATIONS

This application claims the benefit of priority under PCT Rule 4.10 to U.S. Provisional Application Ser. No. 61/900,005, filed Nov. 5, 2013, and entitled "Roof Rack Systems with Sliding Crossbar Assemblies" the entire disclosure of which is incorporated by reference.

TECHNICAL FIELD

The present specification generally relates to roof rack assemblies, and more specifically, to securing mechanisms for roof rack assemblies.

BACKGROUND ART

Vehicles may include roof racks and roof rack assemblies that may be utilized to store luggage. The roof racks and roof rack assemblies may be configured to attach various items, such as boxes or luggage, to a roof of the vehicle for transport. Conventional roof rack assemblies may include rails that extend in a longitudinal direction and a crossbar that extends between the rails.

Conventional roof racks may not include securing mechanisms that allow a user to adjust a crossbar of the roof rack assembly in the longitudinal direction without removing the crossbar from the roof rack assembly. Accordingly, a need exists for alternative roof rack assemblies and securing mechanisms for roof rack assemblies.

SUMMARY OF INVENTION

In one embodiment, a securing mechanism for a roof rack assembly includes a track that extends in a longitudinal direction, the track including an upper lip, a lower lip, and at least one notch that is positioned on the lower lip and that extends downward in a vertical direction through the lower lip, a support portion of a sliding crossbar assembly that is configured to translate along the track, the support portion including a lower surface, a rib positioned on the lower surface, where the rib is configured to engage the at least one notch of the track, a release member that is positioned at least partially within the support portion, and a securing latch that is positioned at least partially within the support portion, where the securing latch is repositionable between a latched position, in which the securing latch is engaged with the upper lip of the track and the rib is engaged with the at least one notch, and a unlatched position, in which the securing latch is detached from the upper lip of the track and the rib is detached from the at least one notch.

In another embodiment, a roof rack assembly includes a track that extends in a longitudinal direction, the track including an upper lip, a lower lip, and at least one notch that extends downward in a vertical direction from the lower lip, a crossbar assembly including a crossbar that extends in a lateral direction that is transverse to the longitudinal direction, where the crossbar is spaced apart from a roof in the vertical direction, a support portion coupled to the crossbar, where the support portion is configured to translate along the track, the support portion including a lower surface, a rib positioned on the lower surface, where the rib is configured to engage the at least one notch of the track, a release member that is positioned at least partially within the support portion, and a securing latch that is positioned at least partially within the support portion, where the roof rack assembly is repositionable between a latched position in which the securing latch is engaged with the upper lip of the track and the rib is engaged with the at least one notch and a unlatched position in which the securing latch is detached from the upper lip of the track and the rib is detached from the at least one notch.

These and additional features provided by the embodiments described herein will be more fully understood in view of the following detailed description, in conjunction with the drawings.

BRIEF DESCRIPTION OF DRAWINGS

The embodiments set forth in the drawings are illustrative and exemplary in nature and not intended to limit the subject matter defined by the claims. The following detailed description of the illustrative embodiments can be understood when read in conjunction with the following drawings, in which:

DESCRIPTION OF EMBODIMENTS

Embodiments described herein generally relate to roof rack assemblies and securing mechanisms for roof rack assemblies. The securing mechanisms include a track that extends in a longitudinal direction, the track including an upper lip and a lower lip. At least one notch is positioned on the lower lip of the track, where the notch extends downward in a vertical direction from the lower lip. The securing mechanism further includes a support portion that includes a lower surface that extends in the longitudinal direction along the support portion, and a rib that is positioned on the lower surface and extends downward from the lower surface in the vertical direction. The securing mechanism further includes a release member positioned at least partially within the support portion and a securing latch that is positioned at least partially within the support portion. The securing mechanism is repositionable between a latched position, in which the securing latch is engaged with the upper lip of the track and the rib is engaged with at least one notch, and an unlatched position, in which the securing latch is detached with the upper lip of the track and the rib is detached from the at least one notch. In some embodiments, the support portion is coupled to a crossbar. These and other embodiments will be described in more detail below in reference to the appended drawings.

As used herein, the term "longitudinal direction" refers to the forward-rearward direction of the roof rack assembly (i.e., in the +/−X-direction depicted in FIGS. 1-8). The term "lateral direction" refers to the cross-roof rack assembly direction (i.e., in the +/−Y-direction depicted in FIGS. 1-8), and is transverse to the longitudinal direction. The term "vertical direction" refers to the upward-downward direction of the roof rack assembly (i.e., in the +/−vehicle Z-direction depicted in FIGS. 1-8).

Figure 1:
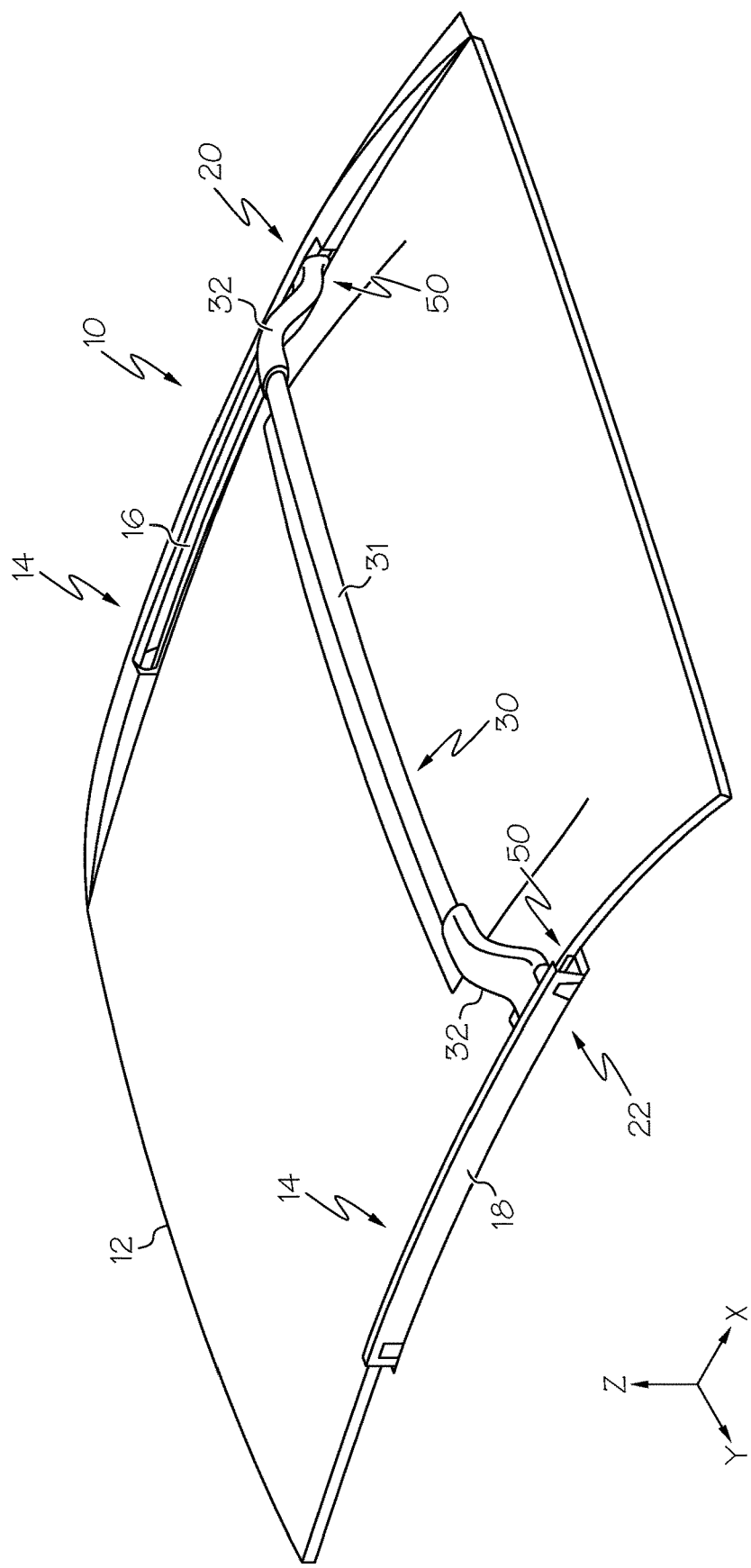
FIG. 1 schematically depicts a perspective view of a roof rack assembly with a sliding crossbar assembly according to one or more embodiments shown or described herein.

Referring to FIG. 1, one embodiment of a roof rack assembly 10 is illustrated. The roof rack assembly 10 may be mounted on a roof 12, of, for example, a vehicle such as a sport utility vehicle, a recreational vehicle, a car, or another vehicle. The roof rack assembly 10 may be mounted on the roof 12 via screws, for example, or may be molded directly into the roof 12. Other mechanical attachment methodologies may be utilized to mount the roof rack assembly 10 on the roof 12, such as welding, nuts and bolts, rivets, and the like. The roof rack assembly 10 includes tracks 14, and may include a first track 16 and a second track 18 that extend in the longitudinal direction. The first track 16 is positioned on a first side 20 of the roof 12 and the second track 18 is positioned on a second side 22 of the roof 12. The roof rack assembly 10 further includes a sliding crossbar assembly 30 and a securing mechanism 50 on either side of the sliding crossbar assembly 30.

The sliding crossbar assembly 30 extends across the roof 12 from the first track 16 to the second track 18 and includes a crossbar 31. The crossbar 31 may be formed from a variety of materials, for example and without limitation, plastic, metal, wood, or a combination thereof. In some embodiments, the crossbar 31 may be hollow, while in other embodiments the crossbar 31 may formed as a partially hollow or solid member. The crossbar 31 may have any suitable cross-sectional shape, such as elliptical, rectangular, triangular, or another cross-sectional shape. The sliding crossbar assembly 30 includes at least one support portion 32 at a first end 34 of the crossbar 31. The support portion 32 may be contoured to allow for the sliding crossbar assembly 30 to be raised above the roof 12, shown in FIG. 1. The support portion 32 may be configured to provide a desired clearance over the roof 12 in the vertical direction, such that the sliding crossbar assembly 30 may be configured to retain and/or restrain luggage, boxes, or the like. The sliding crossbar assembly 30 includes support portions 32 that are coupled to the crossbar 31 at both ends, as shown in FIG. 1, or may include the support portion 32 only on the first end 34. In some embodiments, the support portion 32 may be detachable from the sliding crossbar assembly 30, while in other embodiments, the support portion 32 may be integrally formed with the sliding crossbar assembly 30. The support portion 32 may also be formed from the same material as the sliding crossbar assembly 30, or may be formed from a different material.

Figure 2:
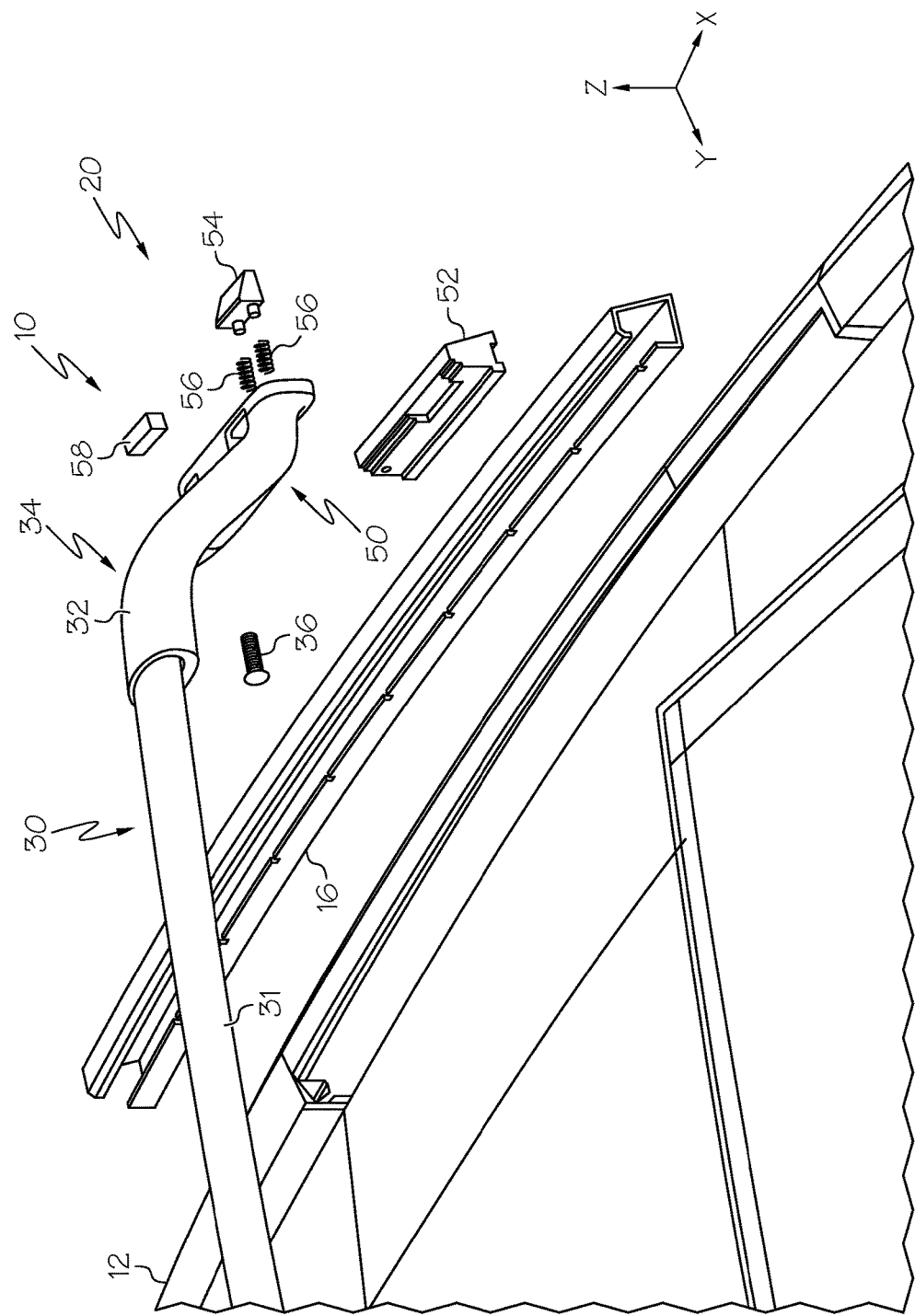
FIG. 2 schematically depicts an exploded view of one end of a sliding crossbar assembly of a roof rack assembly according to one or more embodiments shown or described herein.

Referring to FIG. 2, the securing mechanism 50 is depicted in an exploded view. The securing mechanism 50 includes various components that may be positioned at least partially within both the support portion 32 of the sliding crossbar assembly 30 and the first track 16. In some embodiments, another securing mechanism 50 may be positioned at the opposite end of the sliding crossbar assembly 30 and at least partially within the second track 18. The securing mechanism 50 may include a slider 52, a securing latch 54, a biasing member 56, and a release member 58. While the biasing member 56 of FIG. 2 depicts a compression spring, it should be understood that the biasing member 56 may include a variety of mechanical biasing members, including, but not limited to, a compression spring, a torsion spring, a tension spring, or the like. Similarly, while multiple biasing member 56 are depicted, it should be understood that the securing mechanism 50 may include a single biasing member 56 or any suitable number of biasing members 56.

An engagement member 36 may pivotally couple the sliding crossbar assembly 30 to the slider 52. The slider 52 may be positioned at least partially within in the first track 16 and may be coupled to the support portion 32 of the sliding crossbar assembly 30 by the engagement member 36, as will be described in greater detail herein.

Figure 3A:
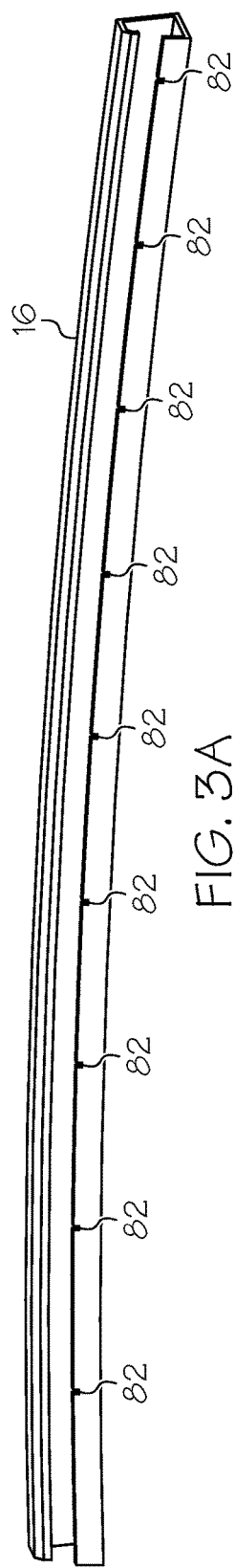
FIG. 3A schematically depicts perspective view of a track of a roof rack assembly according to one or more embodiments shown or described herein.
Figure 3B:
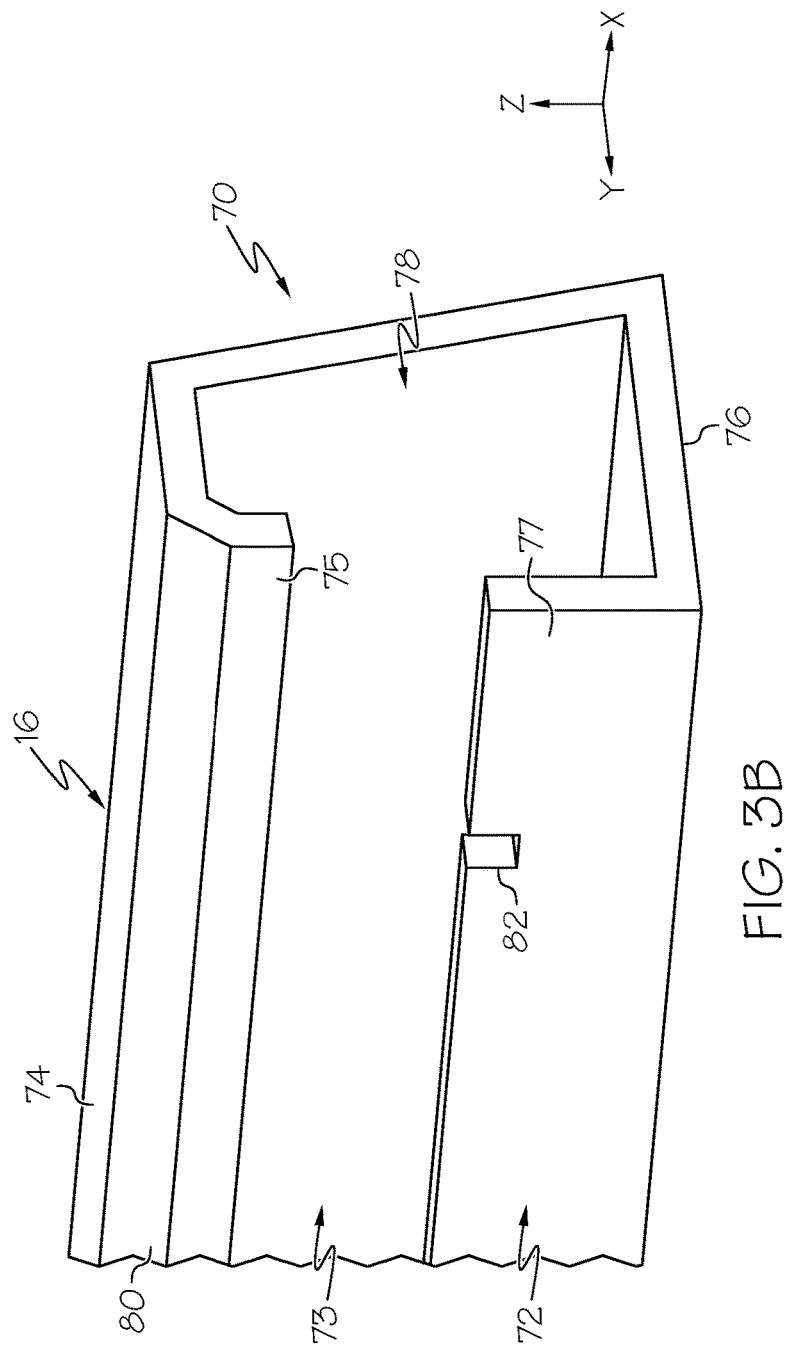
FIG. 3B schematically depicts an enlarged perspective view of a track of a roof rack assembly according to one or more embodiments shown or described herein.

Referring now to FIGS. 3A and 3B, the first track 16 is depicted in a perspective view. The first track 16 may have a generally C-shaped cross-section, as shown in FIGS. 3A and 3B. The first track 16 may include an outer side 70, an inner side 72, a top 74, a bottom 76, and an inner cavity 78. The outer side 70 may be planar, as shown, or may be contoured. The outer side 70 may include any suitable shape. The inner side 72 may include a rail opening 73 that is configured to receive a portion of the sliding crossbar assembly 30. The rail opening 73 may be bounded on top by an upper lip 75 and on bottom by lower lip 77. A height of the rail opening 73 may be selected such that a portion of the support portion 32 may be positioned within the rail opening 73, as will be described in greater detail herein.

The inner cavity 78 of the first track 16 may be configured to receive the slider 52 of the securing mechanism 50. Accordingly, the inner cavity 78 may have a cross-sectional shape that corresponds to a cross-sectional shape of the slider 52. Additionally, dimensions of the inner cavity 78 may correspond to the dimensions of the slider 52 such that the slider 52 may slide freely along the first track 16 in the longitudinal direction. Because the slider 52 may be positioned at least partially within the inner cavity 78, the upper and lower lips 75, 77 of the first track 16 may prevent translation of the sliding crossbar assembly 30 in the lateral direction when the slider 52 is inserted into the first track 16. The inner side 72 of the first track 16 may further include an angled portion 80 positioned near the top 74 of the first track 16. The angled portion 80 may include an angled chamfer that extends along most of, or the entire length of, the first track 16. In other embodiments, the angled portion 80 may not be chamfered and may instead be rounded, angled, recessed, or may comprise any combination thereof. The upper lip 75 extends downward from the angled portion 80 towards the bottom 76 of the first track 16. The angled portion 80 may facilitate repositioning of the sliding crossbar assembly 30 between an unlatched position and a latched position, as will be described in greater detail herein.

Figure 4:
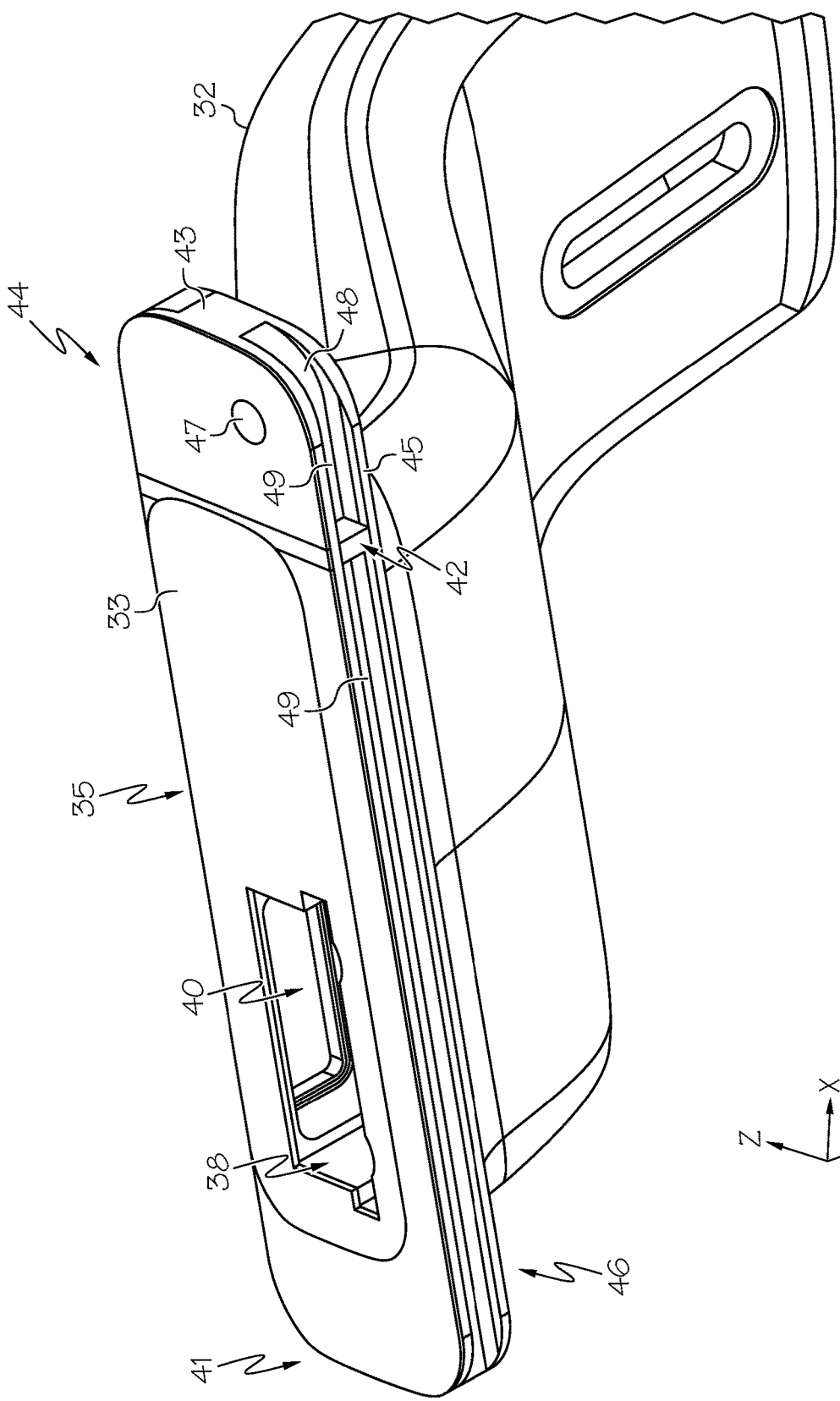
FIG. 4 schematically depicts a perspective view of a support portion of a sliding crossbar assembly according to one or more embodiments shown or described herein.

The first track 16 may further include notches 82 that are positioned on the lower lip 77 along a length of the first track 16. The notches 82 may be configured to receive a rib 42 positioned on the sliding crossbar assembly 30, as shown in FIG. 4. The notches 82 may be rectangular notches, as shown in FIGS. 3A and 3B, or may have any suitable geometry that corresponds to the geometry of the rib 42 positioned on the sliding crossbar assembly 30. The notches 82 extend downward in the vertical direction through the lower lip 77 of the inner side 72 of the first track 16. In other embodiments, the notches 82 may extend all the way down the lower lip 77 of the first track 16. The first track 16 may include any number of notches 82 separated in the longitudinal direction by any suitable distance. In some embodiments the distances between each notch 82 in the longitudinal direction may be uniform, while in other embodiments, the distances between each notch 82 may not be uniform. Although the first track 16 is illustrated in detail in FIGS. 3A and 3B, it should be understood that the second track 18 may correspond with the first track 16. For example, the second track 18 may be a mirror image of the first track 16, such that each notch 82 positioned on the first track 16 may have a corresponding notch positioned at a similar longitudinal position on the second track 18. In other embodiments, only one of the first track 16 or the second track 18 may have notches.

Referring now to FIG. 4, the support portion 32 of the sliding crossbar assembly 30 is depicted in detail. The support portion 32 may include a first opening 38 on a lateral facing surface 33 of the support portion 32. The securing latch 54 of the securing mechanism 50, as shown in FIG. 2, may be positioned at least partially within the first opening 38. The support portion may also include a second opening 40 on an upward facing surface 35 of the support portion 32. The release member 58 of the securing mechanism 50 may be positioned at least partially within the second opening 40. The support portion 32 may also include the rib 42 that is positioned on a lower surface 49 of the support portion 32. The lower surface 49 faces downward in the vertical direction and extends along the support portion 32 in the longitudinal direction. The rib 42 may extend downward from the lower surface 49 in the vertical direction. The rib 42 may be positioned near a rear end 44 of a lower portion 46 of the support portion 32. The rib 42 is configured to engage with individual ones of the notches 82 on the first and/or second tracks 16, 18. The rib 42 may have any dimensions and/or geometry such that the rib 42 may selectively engage with ones of the notches 82. When engaged with the notch 82, the rib 42 may prevent the sliding crossbar assembly 30 from translating in the longitudinal direction along the pair of tracks 14.

The support portion 32 may further include an integrated geometric feature 48 on the lower portion 46 at the rear end 44 of the support portion 32. The integrated geometric feature 48 may be a smooth rounded surface, for example, as shown in FIG. 4, or may be another geometric feature, such as an angled or chamfered corner. The integrated geometric feature 48 may be integrated into the support portion 32. The integrated geometric feature 48 may have a radius of curvature such that the integrated geometric feature 48 is flush with a side portion 43 of the support portion 32, as shown in FIG. 4. The integrated geometric feature 48 may be recessed from a bottom portion 45 of the support portion 32, or may be flush with the bottom portion 45 of the support portion 32. The integrated geometric feature 48 may facilitate rotation of the support portion 32 about the engagement member 36. Because the integrated geometric feature 48 extends between the bottom portion 45 and the side portion 43, contact between the side portion 43 and the lower lip 77 may prevent a front end 41 of the support portion 32 from rotating more than about 90 degrees with respect to either of the pair of tracks 14, as will be described in greater detail herein.

The support portion 32 may further include a through-hole 47 through which the engagement member 36 may pass through to couple the support portion 32 to the slider 52, as described herein. The through-hole 47 may be positioned near the rear end 44 of the support portion 32 and may allow the support portion 32 to rotate about the engagement member 36 when the support portion 32 is not secured to the slider 52, as described below.

Figure 5:
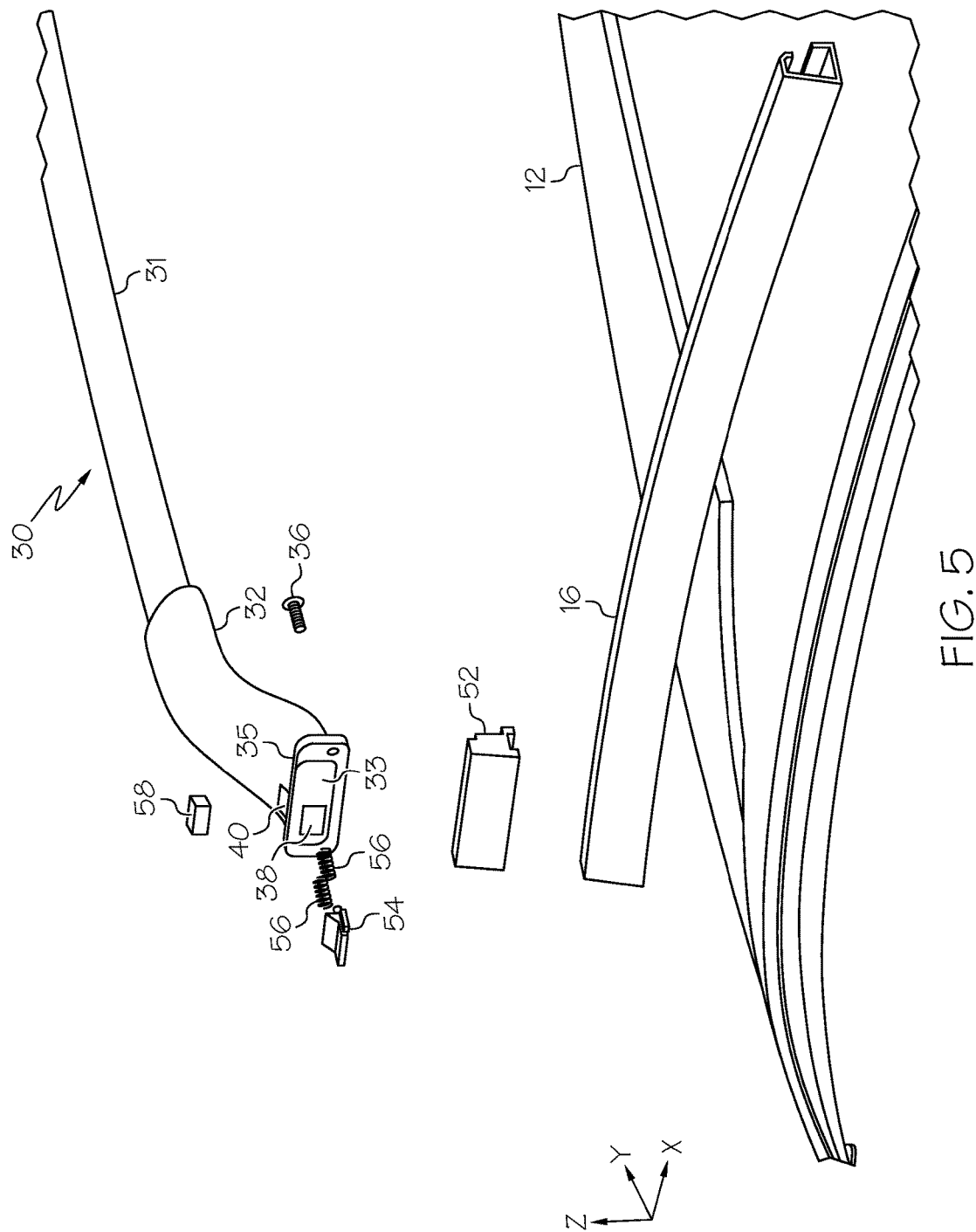
FIG. 5 schematically depicts an exploded view of a securing mechanism according to one or more embodiments shown or described herein.

Referring to FIG. 5, the sliding crossbar assembly 30 and the securing mechanism 50 are shown in an exploded view. The engagement member 36 may be positioned within the through-hole 47 in the support portion 32 and may pivotally couple the support portion 32 to the slider 52. The release member 58 may be positioned at least partially within the second opening 40 of the support portion 32, and the securing latch 54 may be positioned at least partially within the first opening 38 of the support portion 32. The biasing member 56 may be positioned in between the support portion 32 and the securing latch 54 in the lateral direction. The biasing member 56 may be elastically deformed when the securing latch 54 is positioned at least partially within the first opening 38 of the support portion 32. When the biasing member 56 is elastically deformed, the biasing member 56 may exert a force on the securing latch 54 towards the first track 16 in the lateral direction. The force exerted by the biasing member 56 may cause the securing latch 54 to engage with the upper lip 75 of the first track 16 and may prevent the support portion 32 or the sliding crossbar assembly 30 from rotating about the engagement member 36 with respect to the first track 16 and the slider 52, as will be described in greater detail herein. The release member 58 may cause the securing latch 54 to translate and detach from the slider 52 by resisting the outward force of the biasing member 56, as will be discussed in greater detail herein. When the securing latch 54 is detached from the slider 52, the sliding crossbar assembly 30 may rotate about the engagement member 36 with respect to the first track 16, or the slider 52 positioned inside the first track 16, as will be described in greater detail herein.

Figure 6:
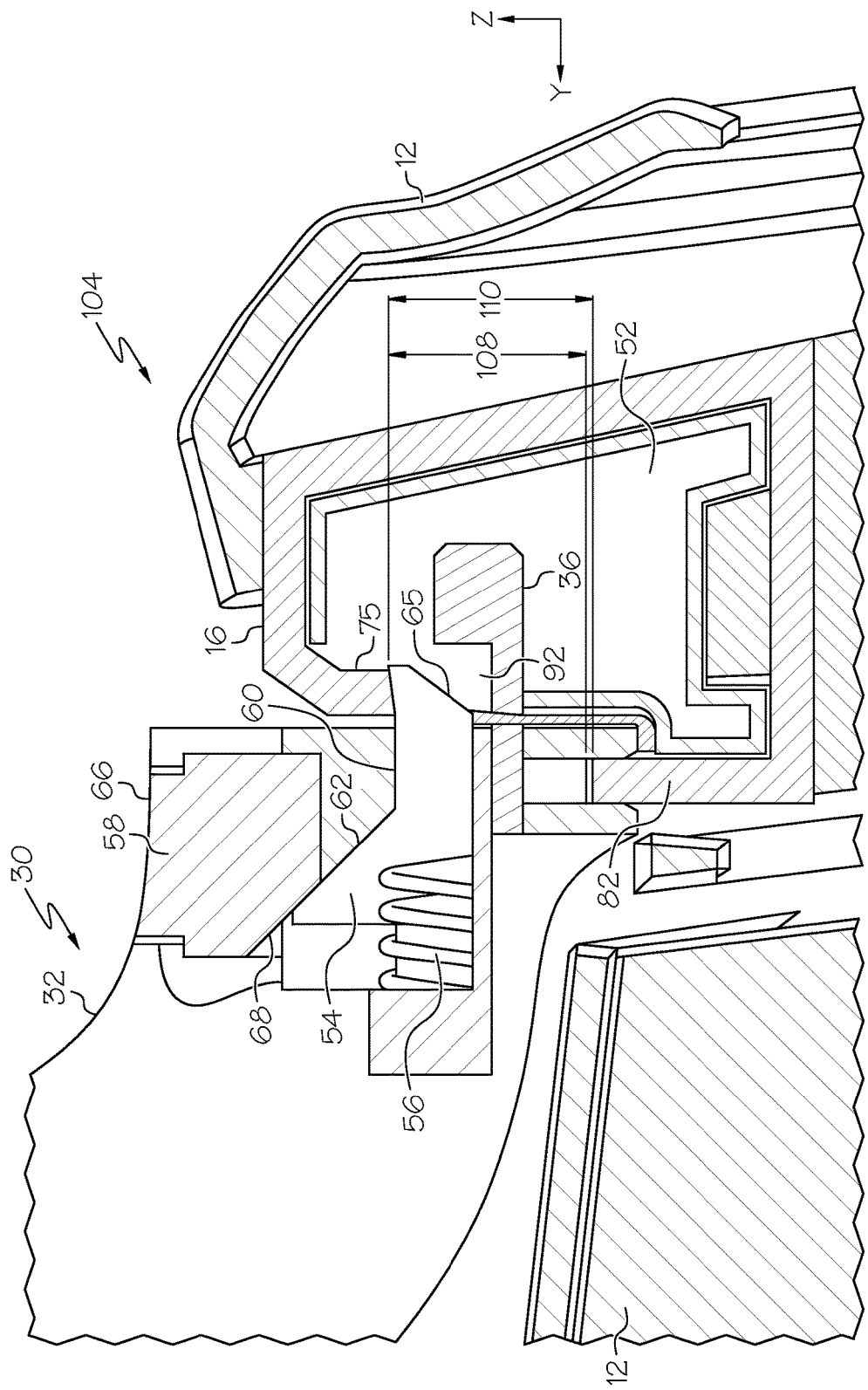
FIG. 6 schematically depicts a cross-sectional view of a securing mechanism according to one or more embodiments shown or described herein.

Referring to FIG. 6, the securing latch 54 may include a securing surface 60, a first releasing surface 62, and at least one spring post 64. In this embodiment, the securing surface 60 of the securing latch 54 faces upward in the vertical direction and is configured to engage with the upper lip 75 of the first track 16, thereby preventing the sliding crossbar assembly 30 from rotating about the engagement member 36. In other embodiments, the securing surface 60 may engage with a surface in the slider 52 that prevents the sliding crossbar assembly 30 from rotating. The securing surface 60 may be planar, as shown in FIG. 6, or may be contoured to conform with the upper lip 75 of the first track 16 or the slider 52.

The securing surface 60 is positioned such that a distance 108 between the securing surface 60 and the lower surface 49 of the support portion 32 in the vertical direction is less than or equal to a distance 110 between the upper lip 75 and the lower lip 77 of the first track 16. Accordingly, the securing surface 60 and the lower surface 49 of the support portion 32 may be positioned between the upper lip 75 and the lower lip 77 in the vertical direction. Because the rib 42, as shown in FIG. 4, extends outward from the lower surface 49 of the support portion 32 in the vertical direction, a distance between the securing surface 60 and the rib 42 in the vertical direction may be greater than the distance 110 between the upper lip 75 and the lower lip 77. Accordingly, the securing surface 60 may not engage the upper lip 75 unless the rib 42 is positioned within a notch 82 of the lower lip 77. With the rib 42 positioned within one of the notches 82 of the first track 16, the securing surface 60 may engage the upper lip 75. With the securing surface engaged with the upper lip 75, the sliding crossbar assembly 30 may be prevented from rotating about the engagement member 36. Further, because the rib 42 is positioned within one of the notches 82 when the securing surface 60 is engaged with the upper lip 75, engagement between the rib 42 and the notch 82 may prevent the sliding crossbar assembly 30 from translating in the longitudinal direction.

The first releasing surface 62 of the securing latch 54 engages with a corresponding second releasing surface 68 on the release member 58. The first releasing surface 62 of the securing latch 54 may be a chamfered surface, as shown in FIG. 6, or may otherwise be angled or rounded, for example. The at least one spring post 64 is configured to receive the biasing member 56 of the securing mechanism 50. For example, the biasing member 56 may be wrapped around the spring posts 64. The spring post 64 may be of any cross-sectional geometry, although illustrated as circular spring posts. In other embodiments, the biasing member 56 may be integrated into the securing latch 54, or more specifically, integrated into or otherwise coupled to the spring posts 64.

The securing latch 54 may also include a track engagement surface 65. The track engagement surface 65 may be chamfered, as shown, or may be angled, rounded, etc. The track engagement surface 65 may assist in facilitating repositioning the sliding crossbar assembly 30 from the unlatched position into the latched position, as will be described in greater detail herein. While being repositioned into the latched position, the sliding crossbar assembly 30 may rotate about the engagement member 36. As the sliding crossbar assembly 30 is rotated, the track engagement surface 65 may contact the first track 16. The track engagement surface 65 may correspond to the angled portion 80 of the first track 16, such that when the track engagement surface 65 contacts the angled portion 80 of the first track 16, the securing latch 54 may translate into the support portion 32 and elastically deform the biasing member 56. As the biasing member 56 is elastically deformed, the securing latch 54 eventually clears the angled portion 80 of the first track 16 and the support portion 32 may continue rotating with respect to the first track 16.

The release member 58 includes an upper surface 66 that may allow a user to engage the release member 58. For example, a user may depress the upper surface 66 of the release member 58 in the vertical direction to release the sliding crossbar assembly 30, as will be discussed in greater detail herein. The release member 58 also includes a second releasing surface 68 that corresponds to the first releasing surface 62 of the securing latch 54. The second releasing surface 68 of the release member 58 may be, for example, a chamfered surface, and may correspond to the first releasing surface 62 of the securing latch 54 in that the first releasing surface 62 and the second releasing surface 68 may be chamfered, angled, rounded, etc. Because the second releasing surface 68 is engaged with and may correspond with the first releasing surface 62 of the securing latch 54, the biasing member 56 may apply an upward force on the release member 58 in the vertical direction.

When the release member 58 is depressed, the second releasing surface 68 of the release member 58 engages the first releasing surface 62 of the securing latch 54. Because the second releasing surface 68 of the release member 58 and the first releasing surface 62 of the securing latch 54 have corresponding surfaces, the release member 58 may cause the securing latch 54 to translate away from the first track 16 in the lateral direction when the release member 58 is depressed, overcoming the biasing member 56. As the securing latch 54 translates away from the first track 16, the securing surface 60 of the securing latch 54 may detach from the upper lip 75 of the first track 16, such that the sliding crossbar assembly 30 may rotate about the engagement member 36.

Figure 8:
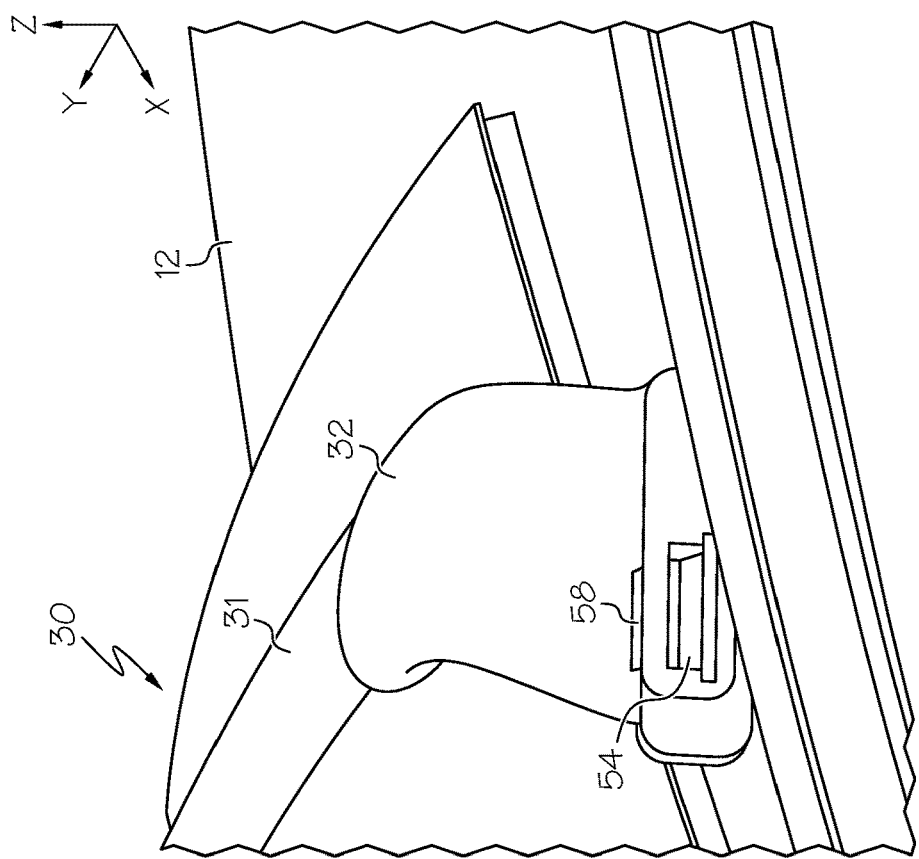
FIG. 8 schematically depicts a perspective view of a sliding crossbar assembly in an unlatched position according to one or more embodiments shown or described herein.
Figure 7:
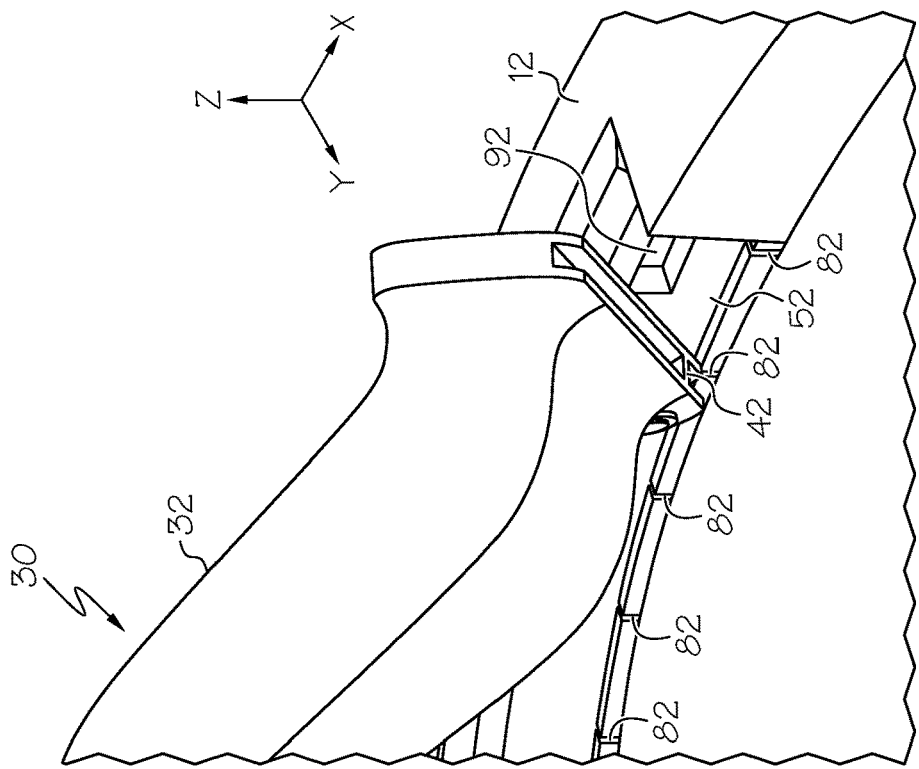
FIG. 7 schematically depicts a perspective view of a sliding crossbar assembly in an unlatched position according to one or more embodiments shown or described herein.

Referring now to FIGS. 7 and 8, in order to release the sliding crossbar assembly 30 from the latched position as shown in FIG. 6 to an unlatched position, as shown in FIGS. 7 and 8, the release member 58 may be pressed in a downward direction, as described hereinabove. When the release member 58 is depressed, the securing surface 60 of the securing latch 54 is detached from the upper lip 75 of the first track 16 and the sliding crossbar assembly 30 may be free to rotate about the engagement member 36 and tilt upward in the vertical direction. When the sliding crossbar assembly 30 is tilted upward, the rib 42 may be detached from the notch 82 of the first track 16. Because the rib 42 may be detached from the notch 82 of the first track 16, the sliding crossbar assembly 30 may freely be translated along the first track 16 in the longitudinal direction. In embodiments that include securing mechanisms 50 on both ends of the sliding crossbar assembly 30, users may individually unlatch each side of the sliding crossbar assembly 30 from the tracks 14.

As described hereinabove, the slider 52 may be positioned at least partially within the first track 16 and may also be pivotally coupled to the support portion 32. Accordingly, when the sliding crossbar assembly 30 is in the unlatched position, the slider 52 and the sliding crossbar assembly 30 may be translated in the longitudinal direction along the tracks 14. Accordingly, a user may adjust a longitudinal position of the sliding crossbar assembly 30 while the sliding crossbar assembly 30 is in the unlatched position.

Referring now to FIGS. 6 and 8, when returning the sliding crossbar assembly 30 to the latched position from the unlatched position, a user may press down on the sliding crossbar assembly 30. When the sliding crossbar assembly 30 is pressed down from the unlatched position, the sliding crossbar assembly 30 rotates about engagement member 36 until the track engagement surface 65 of the securing latch 54 contacts the angled portion 80 of the first track 16. The securing latch 54 translates inwards towards the support portion 32 as the user presses the sliding crossbar assembly 30 down, elastically deforming the biasing member 56. After the track engagement surface 65 rotates past the angled portion 80 of the first track 16, the sliding crossbar assembly 30 may be pressed down further until the securing latch 54 is positioned adjacent to a securing latch cutout 92 of the slider 52. Because the biasing member 56 exerts an outward force on the securing latch 54, the biasing member 56 may translate the securing latch 54 outward in the lateral direction and into the securing latch cutout 92 of the slider 52. Additionally, the securing surface 60 of the securing latch 54 may translate toward the first track 16 and engage the upper lip 75 of the first track 16, thereby securing the sliding crossbar assembly 30 in the latched position. In the latched position, the engagement between the securing latch 54 and the upper lip 75 may prevent rotation of the sliding crossbar assembly 30 about the engagement member 36.

Further, as described hereinabove, the distance between the securing surface 60 and the rib 42 is greater than the distance 110 between the upper lip 75 and the lower lip 77 of the first track 16. Accordingly, the rib 42 must be positioned within one of the notches 82 when the securing surface 60 is engaged with the upper lip 75. Therefore, when the securing surface 60 is engaged with the upper lip 75, engagement between the rib 42 and the notch 82 may prevent the sliding crossbar assembly 30 from translating in the longitudinal direction.

It should now be understood that embodiments described herein are directed to roof rack assemblies and securing mechanisms for roof rack assemblies. The securing mechanisms include a track that includes an upper lip and a lower lip. At least one notch is positioned on the lower lip of the track. A support portion includes a rib that is engageable with the at least one notch, and a securing latch that is engageable with the upper lip of the track. The securing mechanism is repositionable between a latched position, in which the securing latch is engaged with the upper lip of the track and the rib is engaged with the at least one notch, and an unlatched position, in which the securing latch is detached from the upper lip of the track and the rib is detached from the at least one notch. Because the securing mechanism may be selectively repositioned between the latched position and the unlatched position, a user may selectively reposition the securing mechanism and subsequently the roof rack assembly at different longitudinal positions along the track. By allowing a user to selectively reposition the securing mechanism and the roof rack assembly at different longitudinal positions, securing mechanism may be adjusted to accommodate articles such as luggage and boxes that may be attached to the roof of a vehicle.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A securing mechanism for a roof rack assembly comprising:
   a track that extends in a longitudinal direction, the track comprising an upper lip, a lower lip spaced vertically from the upper lip providing space therebetween, and at least one notch that is positioned on a terminal edge of the lower lip and that extends downward in a vertical direction through the lower lip;
   a support portion of a sliding crossbar assembly that is configured to translate along the track, the support portion comprising;
   a lower surface;
   a rib positioned on the lower surface, wherein the rib is configured to engage the at least one notch of the track;
   a release member that is positioned at least partially within the support portion; and
   a securing latch that is positioned at least partially within the support portion, wherein the securing latch is repositionable between:
      a latched position, in which the securing latch extends into the space between the upper lip and the lower lip of the track and is engaged with the upper lip, and the rib is seated within the at least one notch; and
      an unlatched position, in which the securing latch is detached from the upper lip of the track, and the rib is detached from the at least one notch.

2. The securing mechanism of claim 1, wherein the securing latch comprises a securing surface that is engaged with the upper lip in the latched position.

3. The securing mechanism of claim 1, further comprising a biasing member that exerts a force on the securing latch.

4. The securing mechanism of claim 1, wherein the support portion further comprises a first opening on a lateral facing surface of the support portion and wherein the securing latch is positioned at least partially with the first opening.

5. The securing mechanism of claim 1, where the support portion further comprises a second opening on an upward facing surface of the support portion and wherein the release member is positioned at least partially within the second opening.

6. The securing mechanism of claim 1, wherein the securing latch comprises a first releasing surface and the release member comprises a second releasing surface that is engaged with the first releasing surface of the securing latch.

7. The securing mechanism of claim 6, further comprising a biasing member that exerts a force on the securing latch.

8. The securing mechanism of claim 7, wherein the first releasing surface comprises a chamfered surface and the second releasing surface comprises a chamfered surface such that the biasing member exerts a force on the release member.

9. The securing mechanism of claim 1, further comprising a slider that is positioned at least partially within the track and wherein the slider is pivotally coupled to the support portion with an engagement member.

10. The securing mechanism of claim 9, wherein the support portion further comprises an integrated geometric feature that comprises a radius of curvature and that extends between a bottom portion and a side portion of the support portion.

11. A roof rack assembly comprising:
    a track that extends in a longitudinal direction, the track comprising an upper lip, a lower lip spaced vertically from the upper lip providing a space therebetween, and at least one notch that is positioned on a terminal edge of the lower lip and that extends downward in a vertical direction from the lower lip;
    a crossbar assembly comprising;
       a crossbar that extends in a lateral direction that is transverse to the longitudinal direction, wherein the crossbar is spaced apart from a roof in the vertical direction;
    a support portion coupled to the crossbar, wherein the support portion is configured to translate along the track, the support portion comprising;
       a lower surface;
       a rib positioned on the lower surface, wherein the rib is configured to engage the at least one notch of the track;
    a release member that is positioned at least partially within the support portion; and
    a securing latch that is positioned at least partially within the support portion, wherein the roof rack assembly is repositionable between a latched position in which the securing latch extends into the space between the upper lip and the lower lip of the track and is engaged with the upper lip and the rib is seated within the at least one notch and an unlatched position in which the securing latch is detached from the upper lip of the track and the rib is detached from the at least one notch.

12. The roof rack assembly of claim 11, wherein the securing latch comprises a securing surface that is engaged with the upper lip in the latched position.

13. The roof rack assembly of claim 11, further comprising a biasing member that exerts a force on the securing latch.

14. The roof rack assembly of claim 11, wherein the support portion further comprises a first opening on a lateral facing surface of the support portion and wherein the securing latch is positioned at least partially with the first opening.

15. The roof rack assembly of claim 11, where the support portion further comprises a second opening on an upward facing surface of the support portion and wherein the release member is positioned at least partially within the second opening.

16. The roof rack assembly of claim 11, wherein the securing latch comprises a first releasing surface and the release member comprises a second releasing surface that is engaged with the first releasing surface of the securing latch.

17. The roof rack assembly of claim 16, further comprising a biasing member that exerts a force on the securing latch.

18. The roof rack assembly of claim 17, wherein the first releasing surface comprises a chamfered surface and the second releasing surface comprises chamfered surface such that the biasing member exerts a force on the release member.

19. The roof rack assembly of claim 11, further comprising a slider that is positioned at least partially within the track and wherein the slider is pivotally coupled to the support portion with an engagement member.

20. The roof rack assembly of claim 19, wherein the support portion further comprises an integrated geometric feature that comprises a radius of curvature and that extends between a bottom portion and a side portion of the support portion.

* * * * *